United States Patent
Moddemann et al.

(10) Patent No.: US 10,114,346 B2
(45) Date of Patent: Oct. 30, 2018

(54) CONFIGURATION APPARATUS AND METHOD OF CONFIGURING AN AUTOMATION SYSTEM

(71) Applicant: SICK AG, Waldkirch (DE)

(72) Inventors: Jörg Moddemann, Waldkirch (DE); Kllaus Weddingfeld, Waldkirch (DE)

(73) Assignee: SICK AG, Waldkirch (DE)

( * ) Notice: Subject to any disclaimer, the term of this patent is extended or adjusted under 35 U.S.C. 154(b) by 303 days.

(21) Appl. No.: 15/132,289

(22) Filed: Apr. 19, 2016

(65) Prior Publication Data

US 2016/0349714 A1 Dec. 1, 2016

(30) Foreign Application Priority Data

May 27, 2015 (EP) .................................... 15169423

(51) Int. Cl.
  *G06F 8/70* (2018.01)
  *G05B 11/01* (2006.01)
  *G05B 19/042* (2006.01)
(52) U.S. Cl.
  CPC ........ *G05B 11/011* (2013.01); *G05B 19/0426* (2013.01); *G06F 8/70* (2013.01);
  (Continued)
(58) Field of Classification Search
  CPC .................................................. G05B 11/011
  (Continued)

(56) References Cited

U.S. PATENT DOCUMENTS

| 6,615,091 B1 * | 9/2003 | Birchenough ......... B65G 37/02 700/20 |
| 7,788,476 B2 * | 8/2010 | McNutt ................ G05B 19/054 713/1 |

(Continued)

FOREIGN PATENT DOCUMENTS

| EP | 3098672 B1 * | 11/2016 | ........... G05B 11/011 |
| WO | 2006/032344 A1 | 3/2006 | |
| WO | 2010/051104 A1 | 5/2010 | |

OTHER PUBLICATIONS

Fleishanderl, G., et al. "Configuring large systems using generative constraint satisfaction." IEEE Intelligent Systems and their applications 13.4 (1998): pp. 59-68.*

(Continued)

*Primary Examiner* — Satish Rampuria
(74) *Attorney, Agent, or Firm* — Nath, Goldberg & Meyer; Jerald L. Meyer; Stanley N. Protigal

(57) ABSTRACT

To simplify a configuration of an automation system for a customer, a configuration apparatus for configuring an automation system of a customer is provided that comprises device components of one or more manufacturers, having a first software tool that is provided for inputting user data in customer-specific terminology is provided and stores the input user data in a data management sector; having a second software tool that is provided for receiving the user data and that has a calculation unit for determining configuration data from the user data, wherein the second software tool has at least one mapping algorithm that prepares the stored user data for the calculation unit into manufacturer-specific terminology, and wherein a storage of the user data and a storage of the configuration data by the second software tool can be carried out separately from the data management sector of the first software tool.

9 Claims, 2 Drawing Sheets

Figure 1:
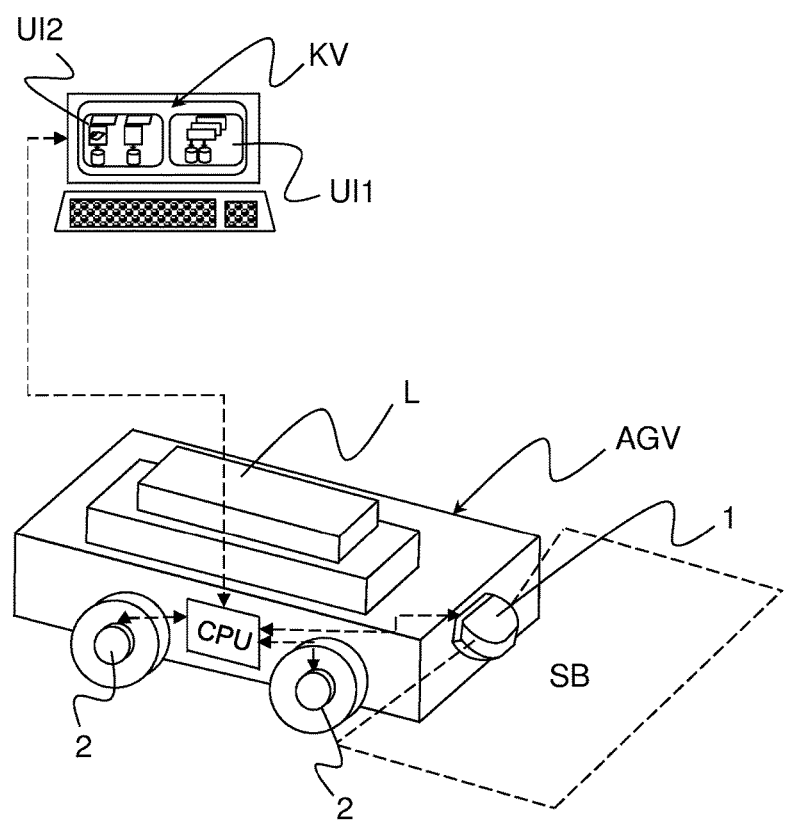

(52) U.S. Cl.
    CPC ............... *G05B 2219/15011* (2013.01); *G05B 2219/35412* (2013.01)

(58) Field of Classification Search
    USPC ...................................................... 700/9–55
    See application file for complete search history.

(56) References Cited

U.S. PATENT DOCUMENTS

| | | | |
|---|---|---|---|
| 8,751,616 B2* | 6/2014 | Karklins ................ | G05B 19/05 700/83 |
| 2004/0122730 A1* | 6/2004 | Tucciarone .......... | G06Q 10/107 705/14.36 |
| 2008/0282583 A1* | 11/2008 | Koellner ................ | E02F 3/304 37/348 |
| 2009/0063760 A1* | 3/2009 | Weddle ............... | G06F 13/1689 711/104 |
| 2010/0108654 A1* | 5/2010 | Ulrich ................. | B23K 9/0953 219/130.5 |
| 2013/0066602 A1* | 3/2013 | Schmidt-Schaffer ..... | B64F 5/00 703/1 |

OTHER PUBLICATIONS

Koren, Yoram, et al. "Reconfigurable manufacturing systems." CIRP annals 48.2 (1999): pp. 527-540.*

Van Brussel, Hendrik, et al. "Reference architecture for holonic manufacturing systems: PROSA." Computers in industry 37.3 (1998): pp. 255-274.*

Office Action for corresponding European Patent Office application 15169423.9 dated Dec. 4, 2015.

* cited by examiner

CONFIGURATION APPARATUS AND METHOD OF CONFIGURING AN AUTOMATION SYSTEM

The invention relates to a configuration apparatus and to a method of configuring an automation system of a customer comprising device components of one or more manufacturers.

Conventionally, a customer in the automation industry can configure a device component of a manufacturer via a computer-based software tool such that the device component has a corresponding behavior for operation with a processing machine of the customer.

For this purpose, the customer frequently has to transfer his knowledge from his specific perspective for the use of his processing machine to the general function of the device component. This frequently also includes the consideration with respect to the terms used or with respect to the terminology of the physical units or with respect to the conversion rules.

To facilitate the configuration of the device component or the transfer of user data of the processing machine to the device component for the customer, some software tools offer functions, so-called assistants, which guide the customer through the setting options of the device component using a step-wise querying of the user data so that the configuration of the automation system is facilitated for the customer.

However, a further disadvantage results in this respect for the customer who e.g. wants to configure an automation system having a plurality of device components since he has to run through all the queries again and again to input his user data for all device components by means of the manufacturer's software tools. On a change of the user data, such as a modification of the processing machine, the customer has to update all the data in the device components, i.e. has to input them again in all assistants.

In the event that the automation system comprises a plurality of device components of different manufacturers, there is the additional problem for the customer of working with different software tools for the different device components or of being familiar with the different software tools.

Automation systems are furthermore known in which the processing machine and the device components are connected to a higher ranking programmable safety control, a so-called PLC, via a bus system. In this process, all the configuration data of the automation system can be stored in the PLC so that the PLC communicates the configuration data of the processing machine and of the device components to the processing machine and to the device components via the bus system, with the configuration data being determined by the PLC in accordance with user data.

The disadvantage also results for the customer in this case that corresponding knowledge of the operation or of the programming of the PLC is required. Furthermore, even if the storage of the configuration data takes place in the PLC, the customer has to update all the user data in the device components to update the configuration data for storage in the PLC accordingly.

It is therefore an object of the invention to improve a configuration apparatus and a method of configuring an automation system such that the configuration is simplified for the customer.

The object is satisfied in accordance with the invention by a configuration apparatus for configuring an automation system of a customer that comprises device components of one or more manufacturers, having at least one first software tool, in particular having a first user interface, that is provided for inputting user data in customer-specific terminologies and that stores the input user data in a data management sector; having a second software tool, in particular having a second user interface, that is provided for receiving the user data and that has a calculation unit for determining configuration data from the user data, wherein the second software tool has at least one mapping algorithm that prepares the user data stored in the customer-specific terminologies for the calculation unit in manufacturer-specific terminologies, and wherein a running through of the user data and a storage of the configuration data by the second software tool can be carried out separately from the data management sector of the first software tool.

In accordance with a preferred embodiment, the first and second software tools each comprise at least one input mask, wherein the input mask of the first software tool is configured for the terminology of the customer and the input mask of the second software tool is configured for the terminology of the manufacturer. It is hereby advantageous for the customer to input the user data in his specific terminology without having to read up on or become familiar with the terminology of the manufacturer. The input masks are advantageously configured to map different uses, e.g. machine types and/or applications, of the customer.

The customer-specific technology further comprises in accordance with a further preferred embodiment a first data format in which the customer describes the user data. In this respect, the user data can be associated with the data management sector of the first software tool.

In accordance with a further preferred embodiment, the user data comprise automation system operating data, preferably load data, movement speed, movement profile or the like of the automation system.

Furthermore, in accordance with a preferred embodiment, the manufacturer-specific terminology comprises a second data format in which the manufacturer describes the configuration data.

In accordance with a preferred embodiment, the configuration data comprise component operating data, preferably acceleration ramps, braking ramps, scan region, reaction times or the like of the device components.

In accordance with a further preferred embodiment, the mapping algorithm of the second software tool furthermore has a conversion algorithm which converts the customer-specific terminological user data into manufacturer-specific terminological data and provides them to the calculation unit.

In accordance with a further preferred embodiment, the customer-specific terminological user data from the data management sector of the first software tool can be associated with the mapping algorithm of the second software tool by means of drag & drop.

The object is furthermore satisfied in accordance with the invention by a method of configuring an automation system of a customer that comprises device components of one or more manufacturers, the method having the steps of inputting and storing user data in customer-specific terminologies in a data management sector by means of a first software tool; linking the user data stored in customer-specific terminologies with at least one mapping algorithm of a second software tool; converting the customer-specific terminologies of the user data into manufacturer-specific terminologies by the mapping algorithm, preparing configuration data from the user data converted in manufacturer-specific terminologies by means of a calculation unit; and providing the manufacturer-specific terminological configuration data of the respective device component of the automation system in a further data management sector.

In accordance with a preferred embodiment, the user data are input in customer-specific terminologies by means of the first software tool.

Furthermore, in accordance with a preferred embodiment, the conversion of the customer-specific terminological user data in manufacturer-specific terminologies and the preparation of the manufacturer-specific terminological configuration data are carried out in the second software tool.

In accordance with a further preferred embodiment, the customer-specific terminological user data are linked to the second software tool by drag & drop from the first software tool.

The configuration apparatus in accordance with the invention and the method in accordance with the invention can be designed in a similar manner by further features and shows similar advantages in this respect. Such further features are described by way of example, but not exclusively, in the dependent claims following the independent claims.

Figure 2:
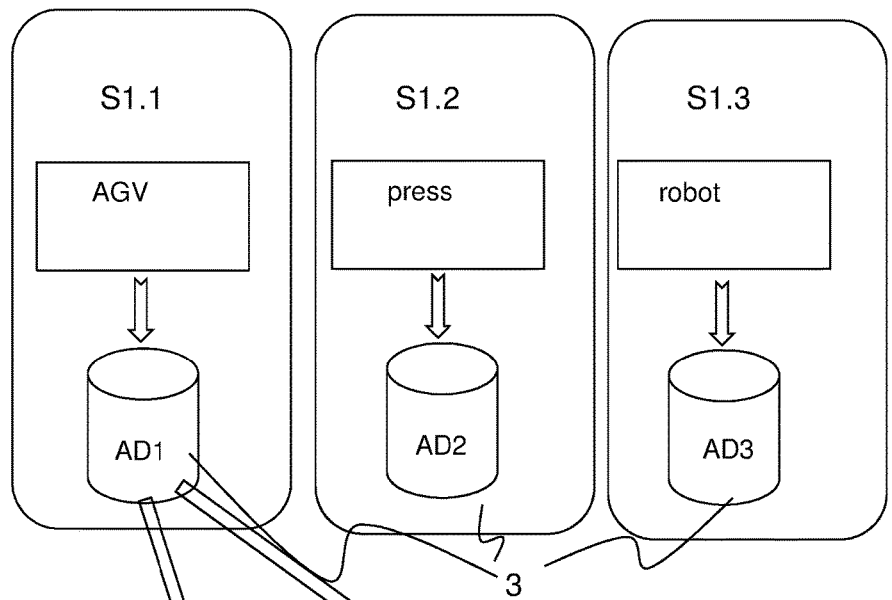
Figure 3:
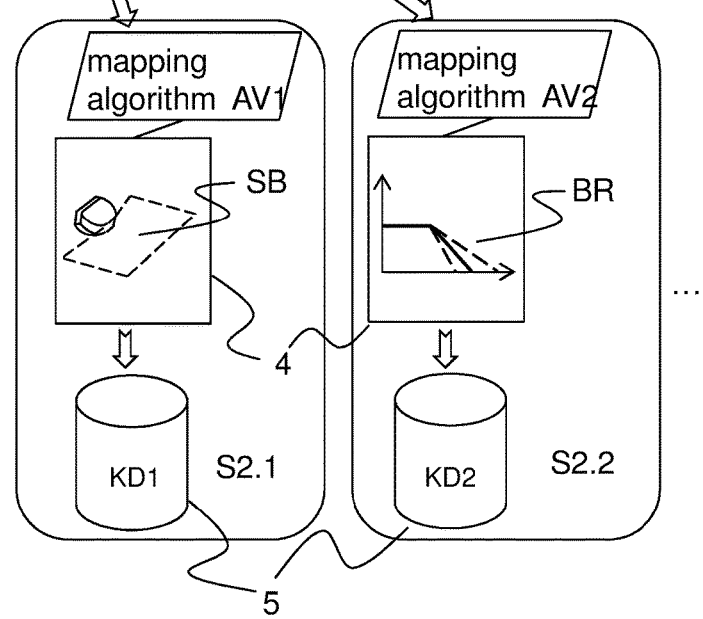

The invention will also be explained in the following with respect to further advantages and features with reference to the enclosed drawing and to embodiments. The Figures of the drawing show in:

FIG. 1 a schematic representation of an embodiment in accordance with the invention; and FIGS. 2 and 3 a schematic detailed representation of the embodiment in accordance with the invention.

A preferred embodiment of the invention is schematically described with reference to FIG. 1 in which a customer wants to configure a processing machine in the form of a driverless transport vehicle, a so-called "automatic guided vehicle", AVG.

The driverless transport vehicle AVG is provided for transporting loads L in the preferred embodiment shown, wherein the loads L can have different dimensions and weights. The handling of the driverless transport vehicle AGV is adapted in accordance with the loads L to be transported. In this respect, the driverless transport vehicle AVG has a central processing unit CPU that monitors and controls the driverless transport vehicle AVG. Data for monitoring and controlling the driverless transport vehicle AGV deliver signals from device components 1, 2 of one manufacturer or of a plurality of manufacturers that are arranged at the driverless transport vehicle AGV.

The driverless transport vehicle AGV, the central processing unit CPU and the device components 1, 2 thus form the automation system of the customer that the customer configures using a configuration apparatus KV in accordance with the invention. In this respect, the mentioned adapted handling and the mentioned loads L to be transported are known to the customer as user data AD1, AD2, AD3 described in more detail in the following.

The configuration apparatus KV in accordance with the invention has a first software tool S1.1, S1.2, S1.3 and a second software tool S2.1, S2.2.

The configuration apparatus KV in accordance with the invention is shown in detail in FIGS. 2 and 3.

FIG. 2 shows three first software tools S1.1, S1.2, S1.3 of the configuration apparatus KV in accordance with the invention. The three first software tools S1.1, S1.2, S1.3 each comprise a user interface that maps different applications of the customer in its customer-specific terminologies. In the example shown, the first user interface maps the application of the driverless transport vehicle AGV. The second user interface maps the application of a press and the third user interface maps the application of a robot.

The customer can input his user data AD1-AD3 in customer-specific terminologies using the three first software tools S1.1, S1.2, S1.3, wherein the input user data AD1-AD3 are stored in a data management sector. The data management sector 3 can also comprise a non-volatile data store.

Customer-specific terminology is understood as a first data format in which the customer describes his user data. I.e. the customer inputs his loads L to be transported, for example under the name "number of crates" with the weight unit "kilograms per crate", or the desired movement profile of his driverless transport vehicle AGV under the name "Profile i" and with the speed "m/s", into the user interface of the first software tool S1.1 of the configuration apparatus KV in accordance with the invention.

From the viewpoint of the customer, the user data therefore comprise operating data of his automation system, in the following also called automation system operating data, which can, for example, be load data, movement speed, movement profile or the like of the driverless transport vehicle AGV.

The customer thus has the advantage that he can input his user data AD1-AD3 in his customary terminology and in the customary data format into the configuration apparatus KV in accordance with the invention.

The configuration apparatus KV in accordance with the invention, as shown in detail in FIG. 3, furthermore has second software tools S2.1, S2.2 that are provided to receive the stored user data AD1 and that are each provided with a calculation unit 4 for determining configuration data KD1, KD2 from the user data AD1. The second software tools S2.1, S2.2 likewise advantageously comprise a respective user interface that is configured for the terminology of the manufacturer or manufacturers of the device components 1, 2.

The manufacturer-specific terminology in this respect comprises a second data format in which the manufacturer or manufacturers describes/describe the configuration data KD1, KD2. The configuration data KD1, KD2 comprise operating data of the device components 1, 2, in the following also called component operating data, wherein the component operating data preferably comprise acceleration ramps, braking ramps BR, scan region SB, reaction times or the like of the device components 1, 2.

The second software tools S2.1, S2.2 each have at least one mapping algorithm AV1, AV2 that prepares the user data AD1 stored in customer-specific terminology for the calculation unit 4 of the second software tools S2.1, S2.2 in manufacturer-specific terminology. The linking of the user data AD1 to the respective mapping algorithms AV1, AV2 is represented by the arrows 6. I.e. the respective mapping algorithm AV1, AV2 adapts the first data format of the user data AD1 to the second data format for the calculation unit 4 of the second software tool S2.1, S2.2 so that the stored user data AD1 can be used by the calculation unit 4. The respective second software tool S2.1, S2.2 for this purpose preferably has a conversion algorithm that converts the customer-specific terminological user data AD1-AD3 into manufacturer-specific terminological data and provides them to the calculation unit 4. The calculation unit 4 of the respective second software tool S2.1, S2.2 generates from them the configuration data KD1, KD2 for the device components 1, 2 of the driverless transport vehicle AGV.

The configuration data KD1, KD2 generated by the calculation unit 4 are stored in a further data management sector 5 and are provided to the customer.

In accordance with the invention, the data management sectors 3, 5 of the first and second software tools S1, S2 are separate from one another so that the customer-specific terminological user data AD1-AD3 from the data management sector 3 are preferably linked to the mapping algorithm AV1, AV2 of the second software tool S2 by means of drag & drop.

In accordance with the described configuration of the driverless transport vehicle AGV, the customer inputs his user data AD1 in customer-specific terminology in the data management sector 3 by means of the first software tool S1. The user data AD1 relating to the number of transported crates and to the load of the driverless transport vehicle AGV in kilograms are stored in this customer-specific terminology in the data management sector 3.

The user data AD1 stored in customer-specific terminology are preferably linked to the mapping algorithm AV1, AV2 of the second software tool S2.1, S2.2 by means of drag & drop, where the customer-specific terminological user data AD1 are converted into manufacturer-specific terminological data. The configuration data KD1, KD2 for the device components 1, 2 are prepared from the data converted in this manner in manufacturer-specific terminology by means of the calculation unit 4 of the second software tool S2.1, S2.2, wherein the configuration data KD1, KD2, for example, comprise the scan region SB of the device component 1 and the braking ramps BR of the device component 2 in accordance with the number of crates and the weight of the load for the driverless transport vehicle AGV.

The prepared configuration data KD1, KD2 for the device components are stored in the further data management sector 5 by the second software tool S2.1, S2.2 and are provided to the device components 1, 2.

In accordance with the invention, the customer can hereby configure his automation system, in particular the driverless transport vehicle AGV having the device components 1, 2, without any knowledge of the manufacturer-specific terminology for the configuration data. On a configuration of a plurality of like automation systems, the customer advantageously only requires a single input of his customer-specific terminological user data into the configuration apparatus KV in accordance with the invention so that the customer can save a lot of time in the multiple configuration.

In accordance with a preferred embodiment, the described user interfaces of the first and second software tools S1.1-S1.3, S2.1-S2.2 can be combined in a single user interface, wherein the described functions of the two software tools S1.1-S1.3, S2.1-S2.2 nevertheless remain separate from one another.

The configuration apparatus KV in accordance with the invention furthermore allows an offline configuration of the automation system so that the configuration data KD1, KD2 can be transferred to the central processing unit CPU of the driverless transport vehicle AGV after a completed configuration.

The second software tool S2.1, S2.2 preferably recognizes when the user data AD1-AD3 in the linked data management sector 3 of the first software tool S1.1-S1.3 have changed so that the second software tool S2.1, S2.2 adapts the configuration data KD1, KD2 in the associated further data management sector 5. The adaptation can advantageously selectively take place automatically or after acknowledgment by the customer.

In accordance with a further preferred embodiment, new versions of the second software tool S2.1, S2.2, in which e.g. new calculation units 4 are implemented, can establish a link to the user data AD1-AD3 stored in the management sector 3 of the first software tool S1.1-S1.3 so that the customer does not have to carry out any new input of his user data AD1-AD3.

Further second software tools S2.i can preferably be added which are associated with existing user data AD1-AD3. When e.g. the automation system is expanded by a further device.

REFERENCE NUMERAL LIST

CPU central processing unit
1, 2 device component
3, 5 data management sector
4 calculation unit
6 linking of the user data to the mapping algorithm
AGV driverless transport vehicle
AD1, AD2, AD3 user data
AV1, AV2 mapping algorithm
BR braking ramp
KD1, KD2 configuration data
KV configuration apparatus
SB scan region
S1.1-S1.3 first software tool
S2.1-S2.2 second software tool

The invention claimed is:
1. A configuration apparatus for configuring an automation system of a customer that comprises device components of one or more manufacturers,
   wherein at least one first user interface inputs user data in customer-specific terminology and stores the input user data in a data management sector, wherein the customer-specific terminology comprises a first data format in which the customer describes the user data and the user data comprise automation system operation data,
   wherein a second user interface is provided for receiving the user data and has determination unit for determining configuration data from the user data,
   wherein the second user interface has at least one mapping technique that prepares the user data stored in customer-specific terminology for the determination unit into manufacturer-specific terminology,
   wherein the manufacturer-specific terminology comprises a second data format in which the manufacturer describes the configuration data and the configuration data comprise component operating data of the device components,
   wherein the at least one mapping technique of the second user interface has a conversion technique that converts the customer-specific terminological user data into manufacturer-specific terminological data and provides them to the determination unit which creates the configuration data,
   wherein a storage of the user data and a storage of the configuration data permits carrying out by the second user interface separately from the data management sector of the first user interface,
   and wherein the first and second user interface each comprise at least one input mask; and wherein the input mask of the first user interface is to input the terminology of the customer and the input mask of the second user interface is to input the terminology of the manufacturer and therefore the customer does not have to read or become familiar with the manufacturer specific terminology.

2. The configuration apparatus in accordance with claim 1, wherein the user data comprise automation system operating data.

3. The configuration apparatus in accordance with claim 2, wherein the automation system operating data comprise load data, movement speed, movement profile or the like of the automation system.

4. The configuration apparatus in accordance with claim 1, wherein the component operating data comprise acceleration ramps, braking ramps, scan region, reaction times or the like of the device components.

5. The configuration apparatus in accordance with claim 1, wherein the customer-specific terminological user data from the data management sector of the first user interface allows linking to the at least one mapping technique of the second user interface by drag and drop.

6. A method of configuring an automation system of a customer that comprises device components of one or more manufacturers, the method comprising the steps:

inputting and storing user data in customer-specific terminology in a data management sector by a first user interface,
wherein the customer-specific terminology comprises a first data format in which the customer describes the user data and the user data comprise automation system operation data;

linking the user data stored in customer-specific terminology to at least one mapping technique of a second user interface;

converting the customer-specific terminologies of the user data in manufacturer-specific terminologies by the at least one mapping technique,
wherein the manufacturer-specific terminology comprises a second data format in which the manufacturer describes the configuration data and the configuration data comprise component operating data of the device components and wherein the at least one mapping technique of the second user interface has a conversion technique that converts the customer-specific terminological user data into manufacturer-specific terminological data and provides them to a determination unit;

preparing configuration data from the user data converted in manufacturer-specific terminology by the determination unit; and providing the manufacturer-specific terminological configuration data of the respective device components of the automation system in a further data management sector, wherein a storage of the user data and a storage of the configuration data-permits carrying out by the second user interface separately from the data management sector of the first user interface, and wherein the first and second user interface each comprise at least one input mask; and wherein the input mask of the first user interface is to input the terminology of the customer and the input mask of the second user interface is to input the terminology of the manufacturer and therefore the customer does not have to read or become familiar with the manufacturer specific terminology.

7. The method in accordance with claim 6, wherein the user data are input in customer-specific terminology by the first user interface.

8. The method in accordance with claim 6, wherein the conversion of the customer-specific terminological user data in manufacturer-specific terminology and the preparation of the manufacturer-specific terminological configuration data are carried out in a second user interface.

9. The method in accordance with claim 6, wherein the customer-specific terminological user data are linked to the second user interface by drag and drop from the first user interface.

* * * * *

UNITED STATES PATENT AND TRADEMARK OFFICE
CERTIFICATE OF CORRECTION

PATENT NO. : 10,114,346 B2
APPLICATION NO. : 15/132289
DATED : October 30, 2018
INVENTOR(S) : Jörg Moddemann and Kllaus Weddingfeld Page 1 of 1

It is certified that error appears in the above-identified patent and that said Letters Patent is hereby corrected as shown below:

In the Claims

Claim 1, Column 6, Line 39, please insert --a-- between "and has" and "determination unit".

Signed and Sealed this
Eleventh Day of December, 2018

Andrei Iancu
*Director of the United States Patent and Trademark Office*